C. F. HETHERINGTON.
STEAM OPERATED GATE FOR PUG MILLS.
APPLICATION FILED MAR. 5, 1921.
1,434,997.
Patented Nov. 7, 1922.
2 SHEETS—SHEET 2.
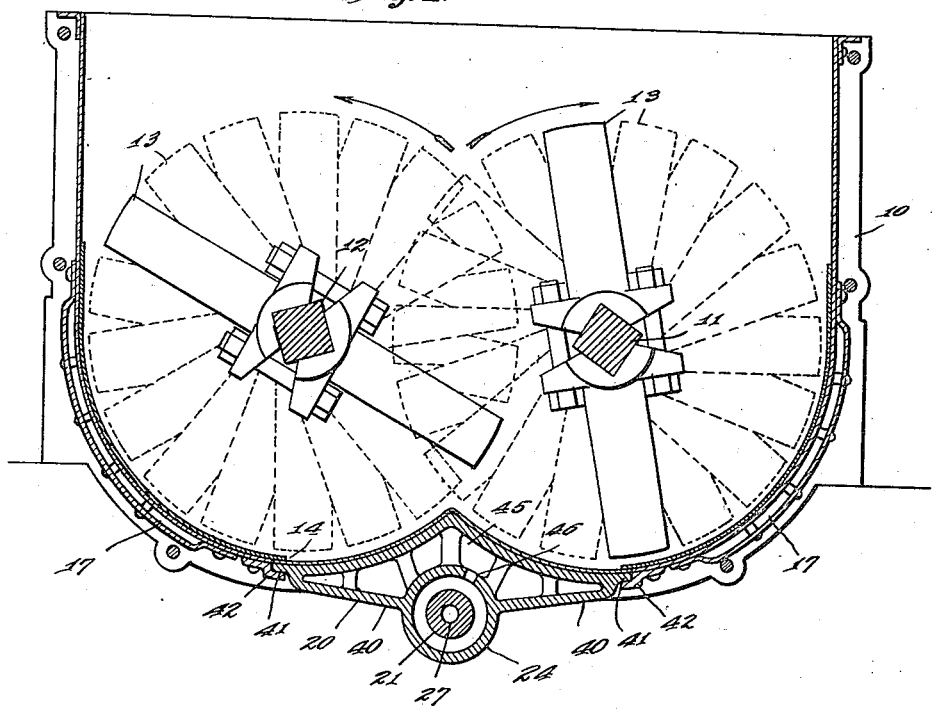
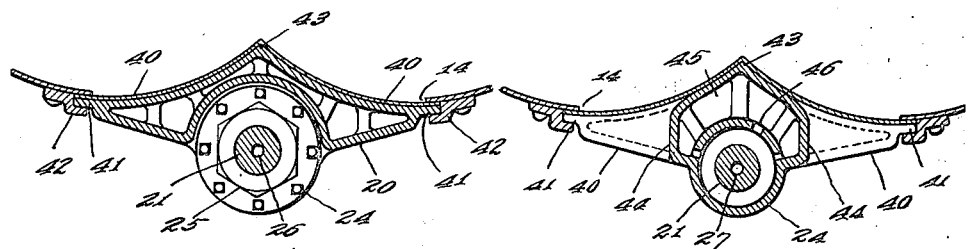
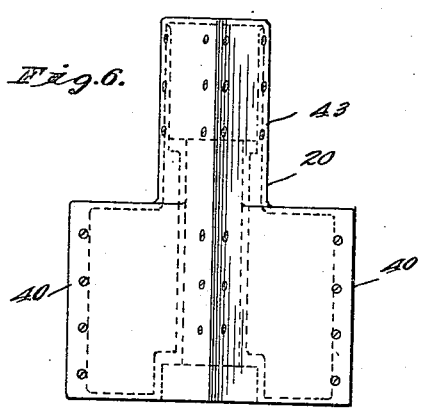
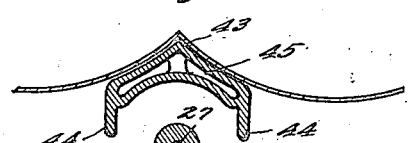
Inventor
Carl F. Hetherington,
By
Attorneys Patented Nov. 7, 1922.

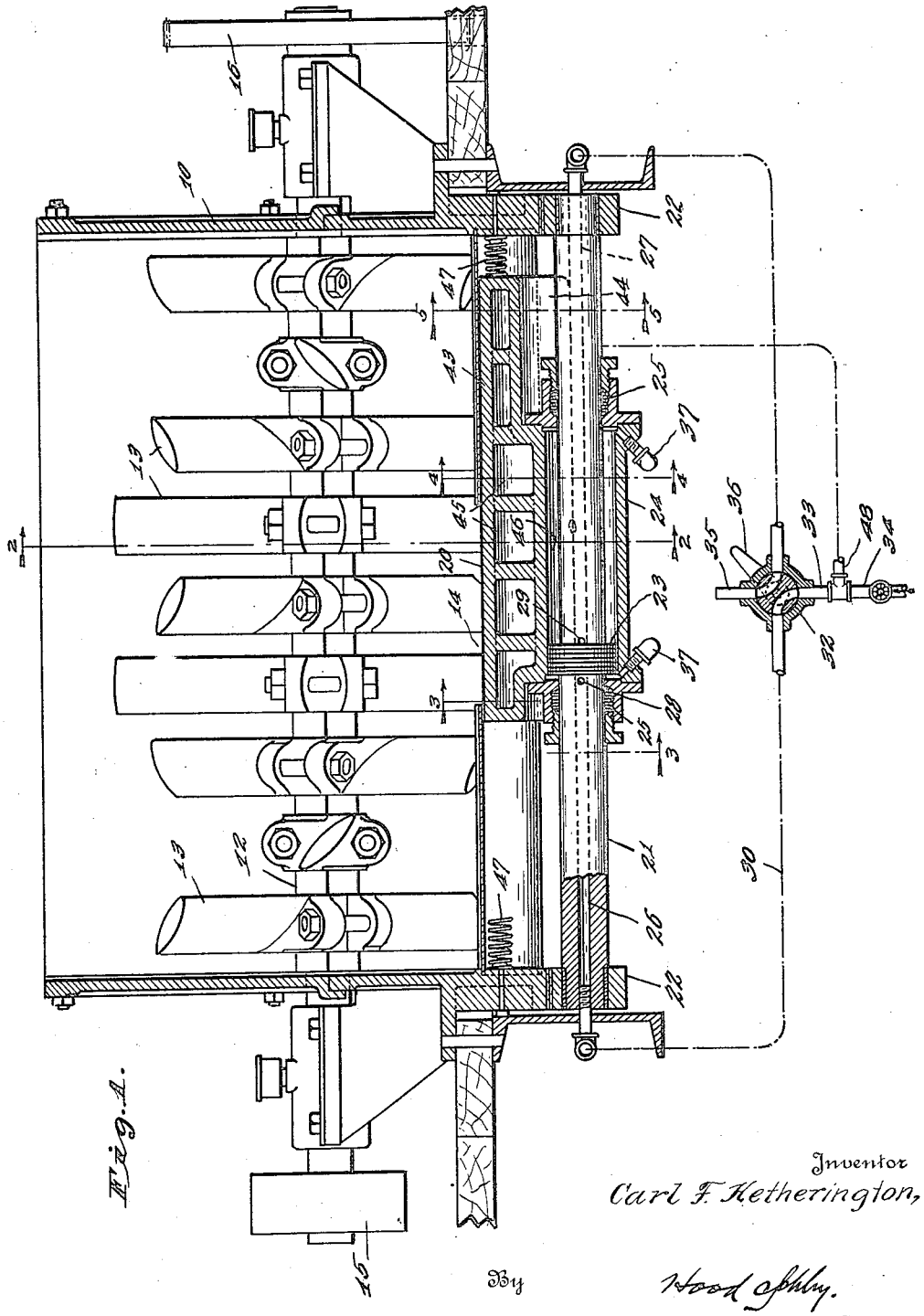

1,434,997

UNITED STATES PATENT OFFICE.

CARL F. HETHERINGTON, OF INDIANAPOLIS, INDIANA, ASSIGNOR TO HETHERINGTON AND BERNER, OF INDIANAPOLIS, INDIANA, A CORPORATION OF INDIANA.

STEAM-OPERATED GATE FOR PUG MILLS.

Application filed March 5, 1921. Serial No. 450,019.

*To all whom it may concern:*

Be it known that I, CARL F. HETHERINGTON, a citizen of the United States, residing at Indianapolis, in the county of Marion and State of Indiana, have invented a new and useful Steam-Operated Gate for Pug Mills, of which the following is a specification.

It is the object of my invention to produce a steam-operated gate for a pug mill, wherein the steam not only operates the gate but supplies the steam-jackets and thus heats it, and wherein the operating parts are out of the way beneath the pug mill.

The accompanying drawings illustrate my invention: Fig. 1 is a longitudinal central section through a pug mill provided with a steam gate embodying my invention, with the steam connections shown diagrammatically; Figs. 2, 3, 4, and 5 are transverse sections on the lines 2—2, 3—3, 4—4, and 5—5, respectively, of Fig. 1; and Fig. 6 is a plan of the gate itself.

The pug mill, which is old of itself, comprises a tank or container 10 for holding the asphalt and sand and other ingredients to be mixed, through which tank two oppositely driven parallel shafts 11 and 12 extend horizontally; and these shafts carry blades 13 which approach each other at the bottom of the container, as indicated by the arrows in Fig. 2, and are of opposite pitch on the two ends of each shaft, so that they tend to feed the asphaltic mixture toward the middle of the container, where there is a discharge opening 14. The bottom of the container 10 is shaped to fit the sweep of the blades 13, as is clear from Fig. 2, so that it has a longitudinal ridge midway between the vertical planes of the two shafts 11 and 12. The shafts 11 and 12 are driven in any suitable manner, as by a pulley 15 on one of them and suitable intermeshing gears 16. To keep the contents of the container 10 hot, it may be provided with suitable steam jackets 17. The pug mill so far described is of itself old and well known.

Below the bottom of the container is a sliding gate 20, which controls the discharge opening 14. This gate is slidably mounted on a rod 21, fixedly mounted at its ends in the end castings 22 of the pug mill. The rod 21 is provided with a piston 23 at an intermediate point, which piston is stationary; and slidably fitting on this piston is a cylinder 24 which forms part of the gate 20. The cylinder is provided at each end with a stuffing box 25 around the rod 21. The rod 21 is provided with two longitudinal holes 26 and 27 which lead from the two ends of the rod inward to the piston 23 and there communicate through transverse holes 28 and 29 with the interior of the cylinder 24 on opposite sides of the piston 23. The two holes 26 and 27 are connected by pipes 30 and 31 respectively to two ports of a four-way valve 32, which also has an inlet port 33 from a steam line 34, and a discharge port 35 for exhaust steam. By manipulating the valve 32 by its handle 36 the steam-line port 33 may be connected to either the pipe 30 or the pipe 31, and the other of such pipes simultaneously connected to the discharge port 33, thus admitting steam to the cylinder 24 on either side of the piston 23 as desired and permitting such steam to escape from the cylinder on the other side of such piston. By putting the valve 32 in the position shown steam will be admitted through the pipe 30, the hole 26, and the hole 28, to the cylinder 24 on the left-hand side of the piston 23, which will cause the cylinder 24 to be moved from the position shown toward the left, to open the gate 20; the position of the parts in Fig. 1 is just as the valve 32 has been moved to the position shown, and before the cylinder 24 has started to move. When the cylinder thus moves, the steam in the cylinder 24 on the right-hand side of the piston escapes through the holes 29 and 27, the pipe 31, and the discharge port 35 of the control valve. When the valve 32 is thrown to its other position the cylinder 24 is moved from its left-hand position (not shown) to the right-hand position in which it is shown, to close the gate 20. The two ends of the cylinder 24 are provided with snifting valves 37, for disposing of any water which condenses in the cylinder.

The gate 20 when in the position shown closes the opening 14, and for this purpose it is provided at its left-hand portion (Fig. 1) with lateral wings 40, the upper surface of which conforms to the bottom of the container 10, the edges of such wings being provided with tongues 41 which have a sliding fit in suitable grooves 42 provided beneath the container bottom, as is clear from Figs. 3 and 4. These wings 40 extend from the left-hand end of the gate toward the right for a somewhat greater distance than the length of the opening 14; but they do not extend the whole length of the gate, and beyond them only the rigid central portion 43 of the gate continues, this portion continuing beyond the right-hand end of the cylinder 42 and being provided at the sides with downwardly projecting flanges 44, which beyond the right-hand end of the cylinder may be free flanges at their lower edges as is indicated in Fig. 5. When the gate is slid to the left, this projecting central ridged portion lies beneath the opening 14, for its full length, and thus overlies the rod 21, on both sides of which the flanges 44 project. This prevents the asphaltic mixture which flows out through the opening 14 when the gate is moved to the left from falling on the rod 21, and thus keeps such rod clean so that there may be no interference with the sliding of the cylinder 24 along it. The central ridged portion 43 guides the gate in its movements, fitting up closely beneath the bottom of the container 10, and the right-hand edge of the opening 14 cleans this ridged portion and the right hand end of the wings 40 (Fig. 1) by scrapping off the asphalt and sand as the gate is moved to the right.

The gate 20 is provided with a number of steam passages 45, both in its winged left-hand portion and its unwinged right-hand portion. These passages 45 all communicate with each other, the ribs between them being provided merely for strength; and they also communicate with the cylinder 24, conveniently at about the middle part thereof, by one or more openings 46 of less length axially of the cylinder 24 than is the piston 23. Thus when the cylinder 24 is at either end of its movement, steam may pass from the cylinder through the opening 46 into the steam passages 45, which thus provides a steam jacket for the gate 20.

Buffer springs 47 are preferably provided on the castings 22 for stopping the gate 20 at the opposite ends of its movement.

A branch steam line 48 may extend from the supply pipe 34 to the steam jackets 17.

I claim as my invention:

1. In combination with a pug mill having a discharge opening in its bottom, a rod extending beneath said pug mill, and a gate slidably mounted on said rod, said gate being provided with steam passages whereby the gate is steam-jacketed.

2. In combination with a pug mill having a discharge opening in its bottom, a gate mounted beneath said pug mill so as to have a horizontal right-line movement and adapted to open and close said opening, said gate being provided with steam passages, and means for conducting steam to said passages.

3. In combination with a pug mill having a discharge opening in its bottom, a rod fixed beneath said pug mill, a piston fixed on said rod, and a gate slidably mounted on said rod and provided with a cylinder in which said piston slidably fits.

4. In combination with a pug mill having a discharge opening in its bottom, a rod fixed beneath said pug mill, a piston fixed on said rod, and a gate slidably mounted on said rod and provided with a cylinder in which said piston slidably fits, said rod being provided with two steam-supply passages respectively opening into said cylinder on opposite sides of said piston.

5. In combination with a pug mill having a discharge opening in its bottom, a rod fixed beneath said pug mill, a piston fixed on said rod, and a gate slidably mounted on said rod and provided with a cylinder in which said piston slidably fits, said gate being provided with steam spaces in addition to said cylinder, which additional steam spaces communicate with the cylinder to receive steam therefrom.

6. In combination with a pug mill having a discharge opening in its bottom, a rod fixed beneath said pug mill, a piston fixed on said rod, and a gate slidably mounted on said rod and provided with a cylinder in which said piston slidably fits, said gate being provided with spaces in addition to said cylinder, which additional spaces are suitably connected to receive steam to form a steam-jacket for the gate.

7. In combination with a pug mill having a discharge opening in its bottom, a rod extending beneath said pug mill, and a gate slidably mounted on said rod, said gate being provided with steam passages whereby the gate is steam-jacketed, said gate being provided with a portion which when the gate is in one position closes the opening and also being provided with a portion which when the gate is in the other position lies beneath the opening but does not close it and overlies the rod to protect the rod from the discharge from the opening.

8. In combination with a pug mill having a discharge opening in its bottom, a rod fixed beneath said pug mill, a piston fixed on said rod, and a gate slidably mounted on said rod and provided with a cylinder in which said piston slidably fits, said gate being provided with a portion which when the gate is in one position closes the opening and also being provided with a portion which when the gate is in the other position lies beneath the opening but does not close it and overlies the rod to protect the rod from the discharge from the opening.

9. In combination with a pug mill having a discharge opening in its bottom, a rod extending beneath said pug mill, and a gate slidably mounted on said rod, said gate being provided with steam passages whereby the gate is steam-jacketed, said rod being provided with a steam passage through which the steam passages in the gate are supplied.

10. In combination with a pug mill having a discharge opening in its bottom, a rod extending beneath said pug mill, and a gate slidably mounted on said rod, said gate being provided with a portion which when the gate is in one position closes the opening and also being provided at one end with a portion which when the gate is in its open position lies beneath the opening but does not close it and overlies the rod to protect the rod from the discharge from the opening.

11. In combination with a pug mill having a discharge opening in its bottom, a rod extending beneath said pug mill and across said opening, and a gate slidably mounted on said rod to open and close said discharge opening by its movements, said gate being provided at one end with a reduced portion which when the gate is open overlies that part of the rod which is beneath the opening to protect the rod from the discharge from the opening.

In witness whereof, I have hereunto set my hand at Indianapolis, Indiana, this 17th day of February, A. D. one thousand nine hundred and twenty-one.

CARL F. HETHERINGTON.